United States Patent

[11] 3,609,555

[72] Inventors Richard Van Blerkom
Rockville;
Don G. Freeman, Gaithersburg; Richard C. Crutchfield, Potomac, all of Md.
[21] Appl. No. 654,412
[22] Filed July 19, 1967
[45] Patented Sept. 28, 1971
[73] Assignee International Business Machines Corporation
Armonk, N.Y.

[54] DIGITAL FM RECEIVER
5 Claims, 7 Drawing Figs.

[52] U.S. Cl. .......... 325/349, 178/88, 235/154, 328/109, 328/140, 325/487, 329/107, 329/126
[51] Int. Cl. .......... H03d 3/00
[50] Field of Search .......... 325/320, 344, 329, 487; 178/88, 66; 235/152, 154; 328/134, 100, 141, 14, 108, 109, 110, 119, 140, 329/104, 110, 114, 126, 128; 340/171

[56] References Cited

UNITED STATES PATENTS

| | | | |
|---|---|---|---|
| 3,024,420 | 3/1962 | Martin | 329/104 |
| 3,028,487 | 4/1962 | Losee | 325/487 |
| 3,222,454 | 12/1965 | Losee | 178/88 |
| 3,399,299 | 8/1968 | Nichols | 235/154 |
| 3,483,474 | 12/1969 | Meranda | 328/119 |
| 3,490,049 | 1/1970 | Choquet et al. | 328/140 |

*Primary Examiner*—Benedict V. Saeourek
*Attorneys*—Hanifin and Jancin and J. Jancin, Jr.

ABSTRACT: A digital FM receiver for receiving information in the form of analog signals on a frequency-modulated carrier at its input and providing said information in digital form at its output. The input signal consisting of a subcarrier modulated by the analog information (baseband) is converted into digital form in an analog to digital converter and is then demodulated in a digital demodulator, providing at its output the baseband information in digital form. The invention herein described was made in the course of or under a contract with the United States Air Force.

INVENTORS
RICHARD VAN BLERKOM
DON G. FREEMAN
RICHARD C. CRUTCHFIELD

DIGITAL FM RECEIVER

BACKGROUND OF THE INVENTION

This invention relates to an FM receiver. More specifically, this invention relates to an FM receiver wherein demodulation of the frequency-modulated input signal is performed in the digital domain, providing a digital output.

Briefly, numerous types of FM receivers are known in the art. Generally, these include a "front-end" or "tuner" portion for separating the carrier from the subcarrier and signal, an intermediate frequency (IF) section for separating the subcarrier from the information signal (baseband). All the operations in these prior art FM receivers are performed by analog circuits such as oscillators, analog filters, and tuned circuits, for example. The baseband information is provided at the output in analog form.

Frequently it is desirable to obtain baseband information from a receiver in digital form. One simple way of doing this would be to connect an analog to digital converter at the analog receiver output. This technique is undesirable for several reasons. There is a problem with noise in converting baseband information demodulated by analog means into digital form by means of an A/D converter. A more significant problem is the inherent limitation in the bandwidth that can be demodulated by presently known analog-type demodulators.

Another technique for demodulating a signal consisting of a subcarrier and the baseband relates to the detection of the number of zero crossings of said signal in a known period of time. In other words, the number of times that the signal containing the baseband and subcarrier crosses the zero axis in a known period of time is an indication of the frequency of said signal, the value of said frequency being the baseband information. A well-known means by which to perform demodulation by this technique is to connect the signal to be demodulated to the input of a counter and resetting said counter periodically. The maximum value in the counter during each cycle, provides the baseband in digital form. Noise in a system of this type makes accurate detection of zero crossings difficult. Another difficulty with this technique is a decreased degree of accuracy when there is a significant variation in the frequency of the baseband during the counting interval.

Other prior art techniques for obtaining a digital output from a frequency-modulated analog input have not been successful primarily because of an attempt to perform each of the specific analog functions that were conventionally performed by analog means, by digital means. This resulted in a carrying over of all the limitations of the analog demodulators into the digital domain. For the purposes of this invention, separate has been used as a synonym for the demodulate and separator has been used as a synonym for demodulator. In the claims, the terms demodulator and demodulate are used. For the purposes of the invention, the input signals are all modulated and signals which can be filtered from the desired signals are not included, since they are removed in the RF amplifier.

SUMMARY

This invention overcomes the difficulties of prior art receivers by demodulating entirely by digital means. Rather than replacing analog devices by direct digital equivalents, the receiver of this invention makes full use of the advantages of digital circuitry, just as the prior art receivers used the advantages of analog circuitry when an analog output was desired. The digital receiver of the invention herein includes an analog to digital (A/D) converter connected to the "front-end" or "tuner" output and a digital demodulator connected to the output of the A/D converter. The input signal to the A/D converter consists of the subcarrier and the baseband. The output of the A/D converter is therefore a plurality of discrete signals occurring in a time sequence at a rate which is equal to the rate at which the input signal is sampled. The output of the A/D converter, consisting of said discrete digital signals, is analyzed in the digital demodulator of this invention, thereby separating the baseband information from the subcarrier.

Accordingly, it is an object of this invention to provide an FM receiver for digitally demodulating a frequency-modulated input signal.

Another object of this invention is to provide an FM receiver with improved accuracy and a reduced susceptibility to noise.

A more specific object of this invention is to provide an FM receiver which demodulates a frequency-modulated analog signal digitally, by operating on the derivatives of the input signal.

The foregoing and other objects, features and advantages of the invention will be apparent from the following and more particular description of preferred embodiments of the invention, as illustrated in the accompanying drawings.

DESCRIPTION OF THE PREFERRED EMBODIMENTS

In accordance with our invention, a composite signal is received into a conventional RF amplifier. This composite signal includes a carrier, a subcarrier and a baseband signal, the latter being the information to be detected. The carrier is removed from the composite signal by a conventional mixer. Depending upon the frequency of the carrier wave, this operation could also be performed by the digital means of this invention. With the carrier wave removed, there remains at the output of the mixer, the subcarrier wave which is frequency modulated by the baseband signal. This frequency-modulated signal is sampled by an analog to digital converter at a frequency much higher than the highest frequency of the subcarrier. The output of the analog to digital converter is a plurality of digital numbers corresponding to the amplitude of the frequency-modulated signal, at every sampling time. The variation of the amplitudes at the output of the A/D converter, as a function of sampling time, is an indication of the frequency of the input signal to the A/D converter. This output of the A/D converter is connected to the input of the digital demodulator of this invention. It is the function of a digital demodulator to provide an output in digital form which is the equivalent of the baseband analog signal at the input of the A/D converter.

Figure 1:
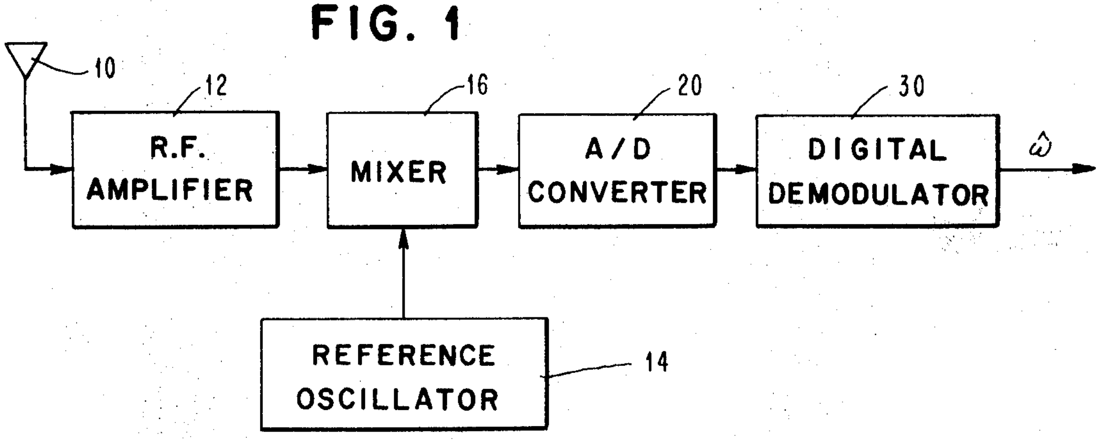
FIG. 1 is a block diagram showing the FM receiver of this invention.

With reference to FIG. 1, analog FM signals including a carrier, subcarrier and a baseband are received at antenna 10, and amplified in RF amplifier 12. The amplified signal is connected to mixer 16, another input to mixer 16 coming from reference oscillator 14, said oscillator 14 oscillating at a frequency equal to the frequency of the carrier wave. The output of mixer 16 is the subcarrier, modulated by the baseband signal. Mixer 16 is therefore a source of frequency-modulated analog signals. A/D converter 20 has as its input the output of mixer 16. A/D converter 20 samples said input signal at a rate much greater than the bandwidth imposed on the subcarrier. An acceptable ratio of sampling rate to maximum frequency would be at least 2 to 1. The output of the A/D converter is the subcarrier modulated by the baseband signal, in digital form. Digital demodulator 30 accepts this baseband-modulated subcarrier at its input and provides the baseband signal $\hat{\omega}$ at its output. The operation of the circuit in FIG. 1 will be described in greater detail later in light of the waveforms in FIG. 2.

Figure 3:
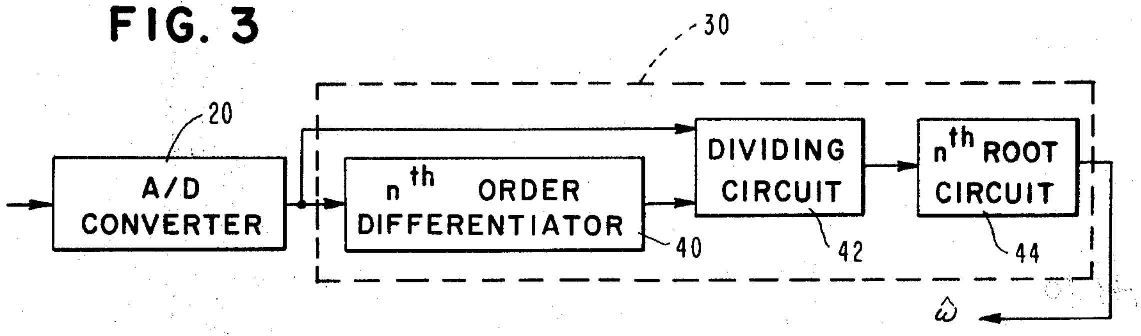
FIG. 3 shows a block diagram of the digital demodulator in FIG. 1.

FIG. 3 shows one embodiment of the digital demodulator 30 connected to the output of A/D converter 20. The embodiment in FIG. 3 consists of $n^{th}$ order differentiator 40, dividing circuit 42, and $n^{th}$ root circuit 44. In accordance with this invention, it has been found that the ratio of the $n^{th}$ derivative of the FM signal to the FM signal is a good estimate of the $n^{th}$ power of the modulation frequency. Although an analog implementation of this concept would be very impractical, it is a natural device for a digital implementation. Since all of the circuits in FIG. 3 have well-known structures, they will be described in greater detail in the operation portion of this specification.

Figure 4:
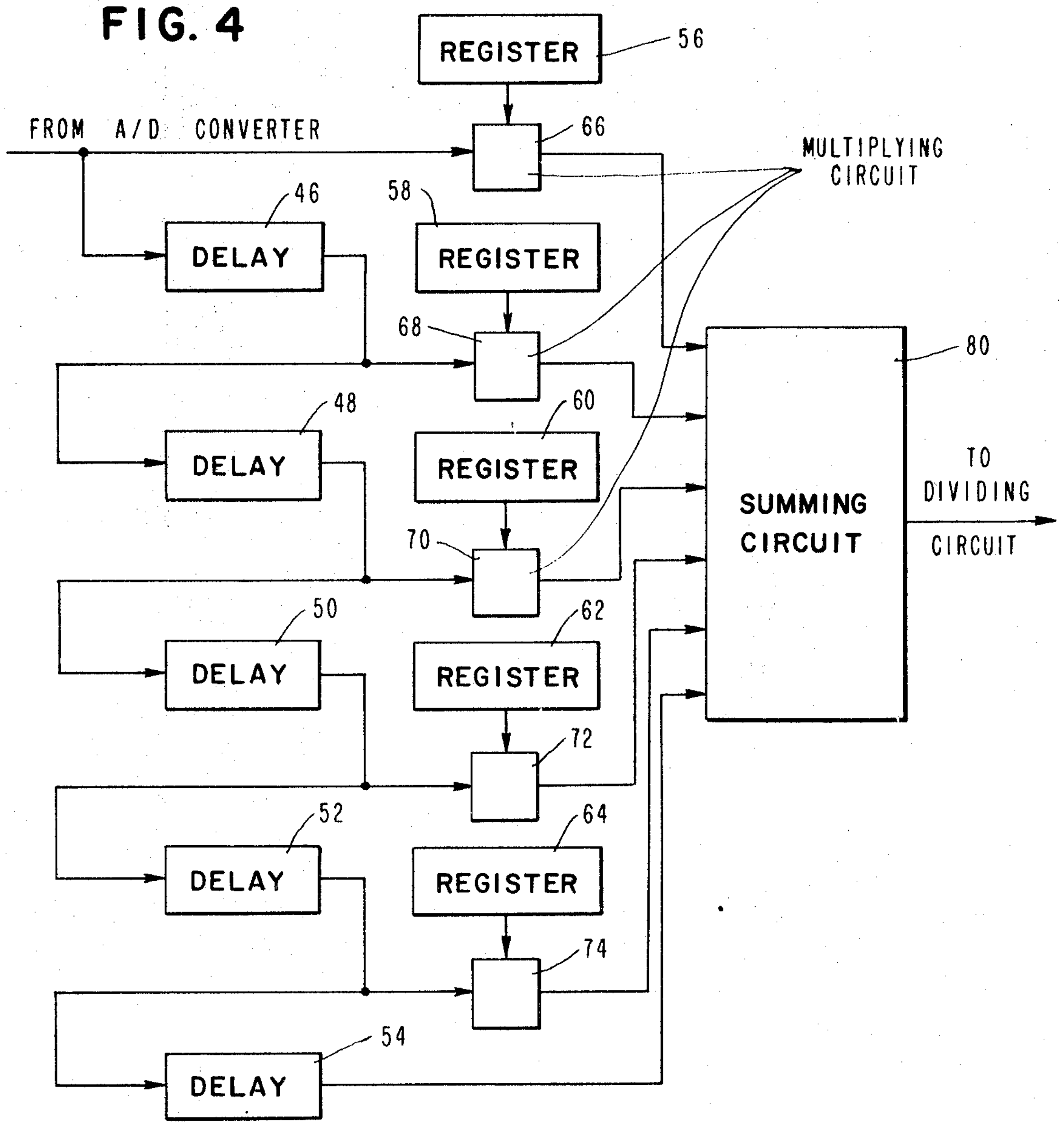
FIG. 4 is a typical differentiating circuit for use in the digital demodulator.

FIG. 4 is a block diagram of the $n^{th}$ order differentiator 40 of FIG. 3. All of the components of the circuit of FIG. 4 are well known and described in detail in "Systems Analysis by Digital Computers," John Wiley & Sons (1966) page 227 et seq. The function of the circuit of FIG. 4 is to obtain a desired order differential of the output of A/D converter 20.

Figure 5:
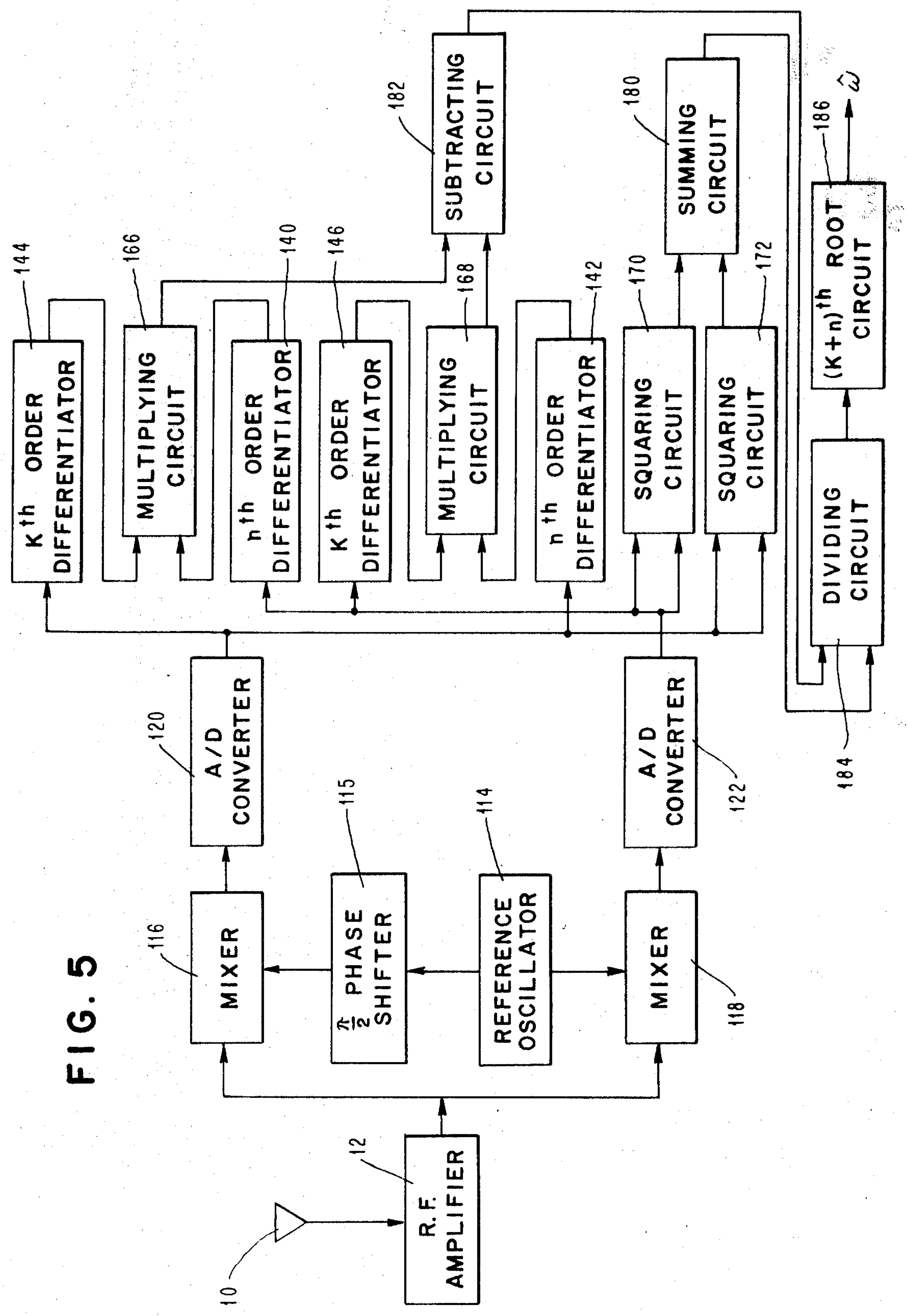
FIG. 5 is another embodiment of the digital demodulator.
Figure 6:
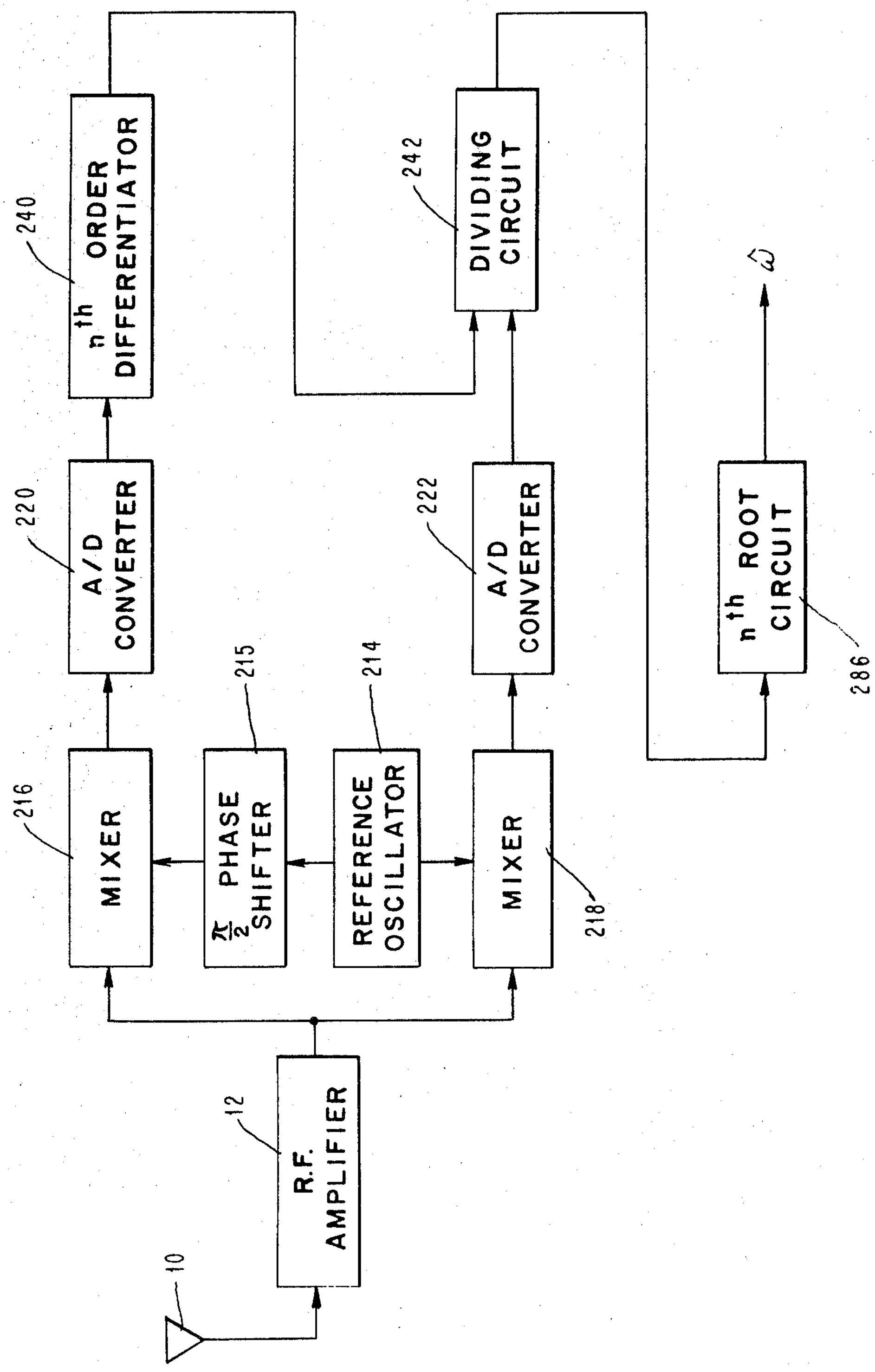
FIG. 6 is still another embodiment of the digital demodulator.
Figure 7:
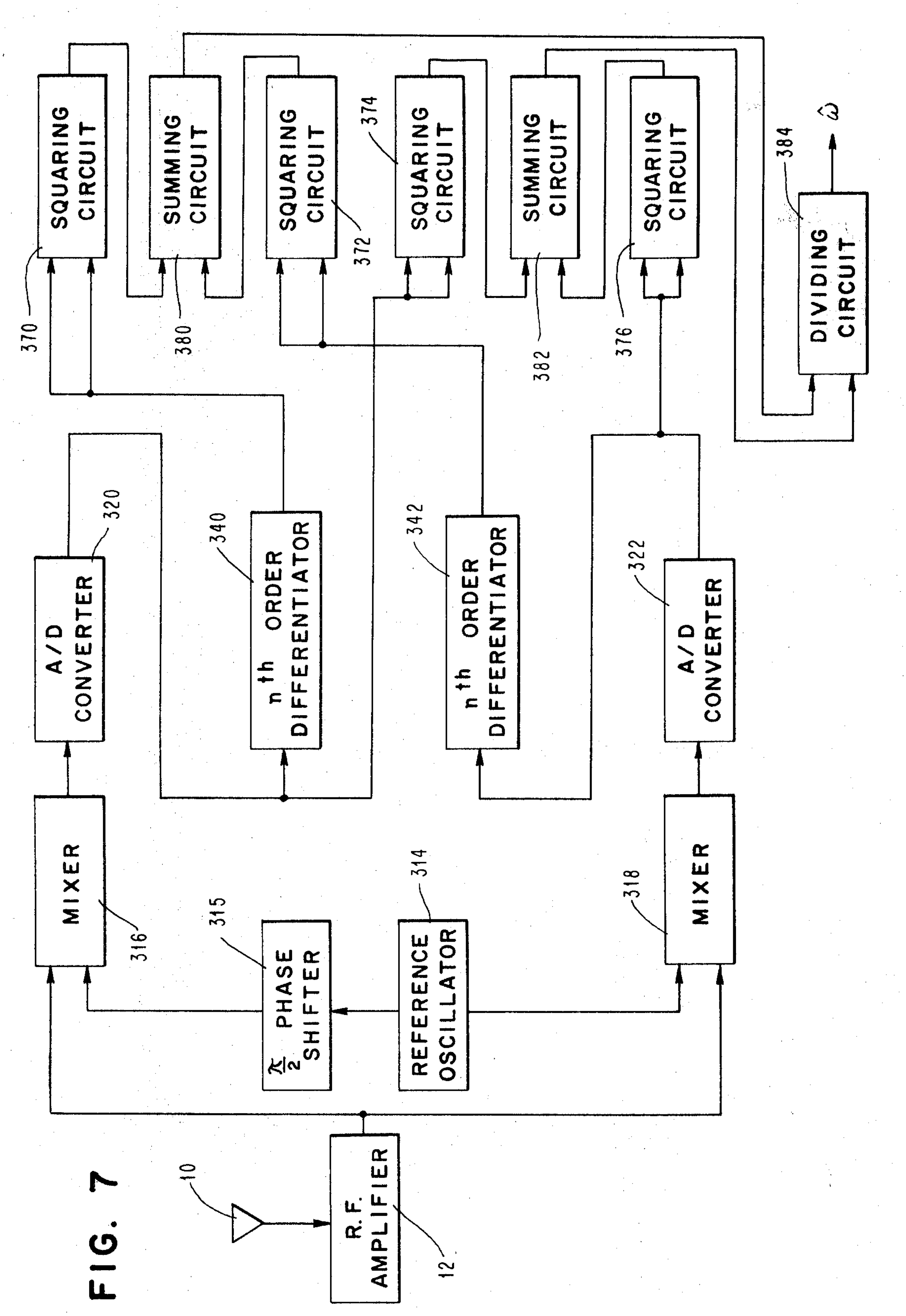
FIG. 7 is a still further embodiment of the digital demodulator which operates on the derivative of the envelope of the input signal.

FIGS. 5, 6, and 7 are alternate embodiments of the digital demodulator 30 (FIG. 1) and each of these circuits will be described in detail in terms of their operation as the circuitry needed within each block of the block diagram is well known. For example, "Digital Computer Design Fundamentals," Yaohan, Chu, McGraw-Hill Book Co. (1962) teaches Multiplying Circuits (pp. 444 et seq.), Summing and Subtracting Circuits (pp. 441 et seq.), Dividing Circuits (pp. 434 et seq.) and $n^{th}$ Root Circuits (pp. 43 et seq.). Also, "Analog to Digital Conversion Handbook," Digital Equipment Corp., Maynard, Mass., C. R. 1964 treats A/D converters in detail.

OPERATION

Figure 2:
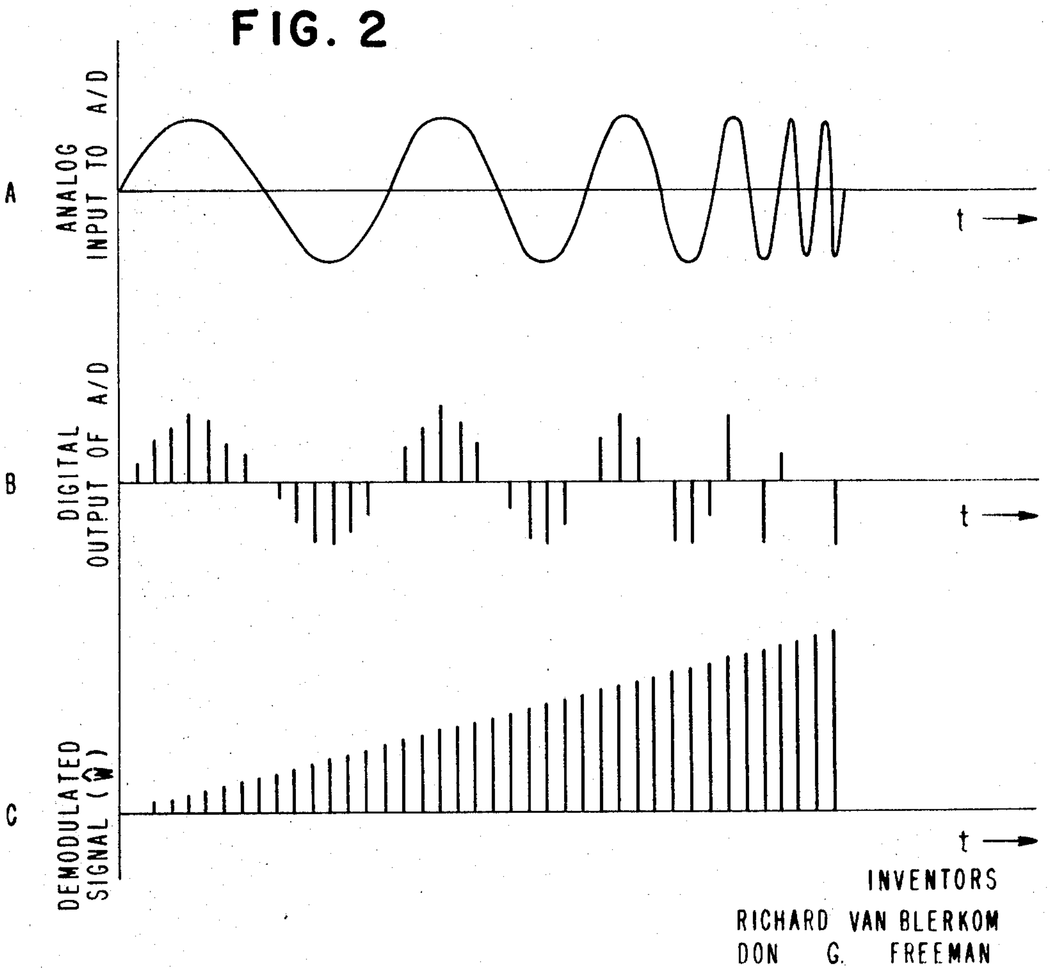
FIG. 2 depicts a typical group of waveforms in the operation of the FM receiver.

The operation of this invention can be understood in terms of the block diagram of FIG. 1 and the waveform diagram of FIG. 2. A composite wave consisting of a carrier, a subcarrier and baseband, enters antenna 10, and is amplified in RF amplifier 12. This composite signal is passed to mixer 16. Any known analog mixer can be selected for removing the carrier waveform from the composite wave. The output of mixer 16 then contains the subcarrier and baseband. Waveform A of FIG. 2 shows a typical waveform that may appear at the output of mixer 16 and the input of A/D converter 20. A/D converter 20 can be one of many such well-known converters and provides at its output discrete digital numbers which are the digital equivalent of the analog signal at the input. Waveform B shows the output of A/D converter 20 in response to waveform A at its input. In waveform B, the density of the line pattern depends on the sampling interval, there being one line for each sample. The height of the lines in waveform B graphically represent the value of the digital number provided at the output of A/D converter 20 with each sample. In practice, the output of A/D converter 20 is a plurality of lines, the binary combination of active and inactive lines being representative of the digital number. These digital numbers, graphically represented in waveform B, are supplied at the input of digital demodulator 30. Digital demodulator 30 provides at its output a series of digital numbers in response to the series of digital numbers provided at its input. The output of digital demodulator 30 is represented graphically in waveform C of FIG. 2. Waveform C shows a digital number output in response to every digital number input. Waveform C indicates a steadily increasing series of numbers. This output is in response to the input (waveform A) which indicates a steadily increasing analog frequency. The series of digital numbers shown in waveform C is therefore an indication of the baseband information in waveform A.

The waveforms in FIG. 2 are supplied for purposes of illustration, to demonstrate how the apparatus of this invention provides a series of digital numbers which are indicative of the original baseband information. FIG. 2 illustrates how variations in the frequency of waveform A result in corresponding variations in the waveform C which is a graphical representation of the output of digital demodulator 30. The symbol $\hat{\omega}$ is used to indicate that the output is an estimate of the original baseband information. Ideally, the output of digital demodulator 30 would represent the baseband exactly. Due to noise conditions usually present in any FM receiver system, the output of demodulator 30 may not always correspond exactly to the baseband information contained in the composite waveform received at antenna 10. The receiver of this invention, however, is much less susceptible to noise than other receivers in the art.

As was mentioned above, FIG. 3 is one embodiment of the digital demodulator 30 (FIG. 1). The output of the A/D converter 20 is supplied to both $n^{th}$ order differentiator 40 and divider circuit 42. Differentiator 40 provides an $n^{th}$ order derivative of its input. Dividing circuit 42 operates to divide the output of $n^{th}$ order differentiator 40 by the output of A/D converter 20. Dividing circuit 42 is of conventional design. (For example, see Yaohan Chu, "Digital Computer Design Fundamentals," McGraw-Hill Book Company, p. 434 et seq., 1962). The output of dividing circuit 42 is a series of digital numbers which represent the result of the indicated division. The $n^{th}$ root circuit 44 obtains the desired root of the signals at its input, providing an estimate of the baseband signal at its output. The order of the root obtained in $n^{th}$ root circuit 44 is the same as the order of the derivatives obtained by $n^{th}$ order differentiator 40. For example, if a second derivative is obtained by differentiator 40, the square root would be obtained by circuit 44. (A typical $n^{th}$ root circuit may be found on page 435 et seq. of the Chu reference mentioned above.)

The output condition of the circuit of FIG. 3 in terms of the input conditions can be described by the following formula:

$$\hat{\omega}=\left[\pm\frac{S^{(n)}(t)}{S(t)}\right]^{1/n} \qquad (1)$$

where $n$=2, 4, 6,...(other even numbers). In the above equation: $S(t)$ = the input signal, $S^{(n)}(t)$=$n^{th}$ derivative, and $\omega$ = an estimate of the frequency. In the operation of this circuit, consider the input signal to be in the form:

$$S(t)=A\cos(\omega_c+\omega_0)t+N(t) \qquad (2)$$

where $A$ = amplitude of the signal $\theta$ = phase of the signal $N(t)$ = additive noise $\omega$ = the parameter to be estimated $\omega_c$ = carrier frequency The in-phase quadrature component is $$X(t)=A\cos(\omega_0 t+\theta)+N_c(t) \qquad (3)$$

where $N_c(t)$ is the in-phase (sine) component of the noise.

Assuming that $A$, $\theta$ and $\hat{\omega}$ are constant over the measurement interval, the output of the $n^{th}$ even order differentiation of the phase quadrature component is, $$x^{(n)}=\pm(\omega_0)^{(n)}A\cos(\omega_0 t+\theta)+N_c^{n}(t), \qquad (4)$$

$n$=2, 4, 6,... The frequency estimate is then obtained by dividing the original signal into its $n^{th}$ derivative followed by an $n^{th}$ root operation. The result is, $$\hat{\omega}=\left[\frac{\pm(\omega_0)^n A\cos(\omega_0 t+\theta)+N_c^{(n)}(t)}{A\cos(\omega_0 t+\theta)+N_c(t)}\right]^{1/n} \qquad (5)$$

$n$=2, 4, 6,...

For the noise-free case, one can see from equation (5) that $\omega_0=\hat{\omega}$. If noise is present, this equality doesn't hold. The basic demodulator shown in FIG. 3 requires an $n^{th}$ derivative, a division, and an $n^{th}$ root operation. These three circuits have straightforward state-of-the-art implementations. For example, the $n^{th}$ differentiator is shown in greater detail in FIG. 4. The reason for letting $n$ equal even numbers is that in the digital circuit implementation, even derivatives and even roots are less complex.

The digital demodulator embodiment of FIG. 3 is the simplest embodiment. The other embodiments described herein utilize not only the in-phase quadrature component of the input signal, but also the quadrature component that is 90° out of phase with the input signal. For this reason, the other embodiments require two A/D converters and two mixers. The other embodiments, although more complex, have various other advantages which will be described herein.

FIG. 4 shows a block diagram of a differentiating circuit for use in the demodulators of this invention. The structure and operation of this differentiating circuit are well known and fully described in F. F. Kuo and J. F. Kaiser, "Systems Analysis by Digital Computers," John Wiley & Sons, 1966. The particular embodiment in FIG. 4 consists of five sets of multiplying circuits, registers, and delay circuits, thereby deriving the fifth order differential. Differentiating circuits generally are well known in the art for obtaining a desired order derivative of an input.

Referring now to FIG. 5, a second embodiment of the demodulator of this invention is shown. The composite waveform consisting of carrier, subcarrier and baseband signal, enters through antenna 10 and is amplified in RF amplifier 12. Two mixers 116 and 118 are connected to the output of RF amplifier 12, instead of the single mixer used in the previously described embodiment (FIG. 3). The output of mixer 118 consists of the subcarrier and baseband signal. The output of mixer 116 is the quadrature component of the subcarrier and baseband that is 90° out of phase with the input signal. The output of mixer circuits 116 and 118 are converted into digital form in A/D converter circuits 120 and 122. The output of each of circuits 120 and 122 is utilized as the input to a $k^{th}$ order differentiator, an $n^{th}$ order differentiator, and a squaring circuit. In each case, the output of the $k^{th}$ order differentiator and the $n^{th}$ order differentiator are multiplied in a multiplying circuit. The output of each of the multiplying circuits is the input to the subtracting circuit 182 said subtracting circuit providing the difference of the two inputs at its output. The output of each of the squaring circuits is added in summing circuit 180, said summing circuit providing the sum of the two inputs at its output. The output of the subtracting circuit 182 is divided by the output of summing circuit 180 in dividing circuit 184 which provides the quotient resulting from the division of the two numbers at its input. The output of dividing circuit 184 is connected to the input of root circuit 186 which obtains the desired root of the input signal. The output of root circuit 186 is an estimate of the baseband information in digital form. The aforementioned differentiator and root circuits have a requirement that $n$ and $k$ be whole numbers, such that $n+k$ is odd and that $n$ is greater than $k$. Otherwise, $k^{th}$ order differentiator circuits 144, and 146, and $n^{th}$ order differentiator circuits 140, and 142, may be constructed in accordance with FIG. 4, the only difference being in the order of the resulting derivative. For a detailed description of summing circuit 180 and subtracting circuit 182 see Chu, "-Digital Computer Design Fundamentals," McGraw-Hill Book Co., 1962, page 441 et seq. For a description of multiplier circuits 166 and 168 see the same reference, pages 444 et seq. For a description of root circuit 186, see the same reference on page 435 et seq. Also, for a more detailed description of the differentiator circuit see F. F. Kuo and J. F. Kaiser, "Systems Analysis by Digital Computers," John Wiley & Sons, 1966.

The output conditions of the circuit of FIG. 5 in terms of the input conditions can be described by the following formula:

$$\omega_0=\left[\frac{\overset{(k)}{x}\overset{(n)}{y}-\overset{(k)}{y}\overset{(n)}{x}}{x^2+y^2}\right]^{\frac{1}{n+k}} \qquad (6)$$

$n, k=0, 1, 2, 3, \ldots$ such that $n+k$ is odd and $n>k$ $x(t)$ and $y(t)$ are quadrature components $x^{(n)}$ and $y^{(n)}$ are the $n^{th}$ derivatives $\hat{\omega}$ = frequency estimate.

Consider the input signal to be $s(t)=A\cos\{(\omega_c+\omega_0)t+\theta\}+N(t)$ (7) where $A$ = amplitude of the signal $\theta$ = phase of the signal $N(t)$ = additive noise $\omega_0$ = the parameter to be estimated $\omega_c$ = carrier frequency The quadrature components are $x(t)=A\cos(\omega_0 t+\theta)+N_c(t)$ $y(t)=A\sin(\omega_0 t+\theta)+N_s(t)$ (8)

where $N_c(t)$ and $N_s(t)$ are the cosine and sine components of the noise respectively.

Assuming that $\theta$ and $\omega_0$ are constant over the measurement interval, the output of the $k^{th}$ order differentiator with input $x(t)$ is $$\overset{(k)}{x}=\begin{cases}\pm(\omega_0)^k A\cos(\omega_0 t+\theta)+\overset{(k)}{N_c}\; k=2, 4, 6, \ldots \\ \pm(\omega_0)^k A\sin(\omega_0 t+\theta)+\overset{(k)}{N_c}\cdot k=1, 3, 4, \ldots\end{cases} \qquad (9)$$

A similar equation holds for $y^k$. The indexes $k$ and $n$ in Equation (6) must be integers with the restriction that is $n$ is an even integer, $k$ is an odd integer and vice versa.

As shown in FIG. 5, once the quadrature components are obtained, they are each fed into a $k^{th}$ order and a $n^{th}$ order differentiator. The differentiator outputs are then combined as shown in FIG. 5 and divided by the sum of the squares of the quadrature components.

To further illustrate this receiver, consider the case where $k=0$ and $n=1$, and no noise in present (i.e., $N_c=N_s=0$). Equation (6) becomes, $$\hat{\omega}=\frac{[A\cos(\omega_0 t+\theta)][\omega_0 A\cos(\omega_0 t+\theta)]-[A\sin(\omega_0 t+\theta)][(-\omega_0 A\sin(\omega_0 t+\theta)]}{A^2\cos^2(\omega_0 t+\theta)+A^2\sin^2(\omega_0 t+\theta)}$$

Factoring out $\omega_0$ and cancelling terms give $\omega=\omega_0$ as one would expect.

The embodiment just described has been found to have somewhat superior performance to the previously described embodiment. An additional advantage is that the amplitude of the signal, A, does not have to be constant over the measurement interval. As a result, the performance of the FIG. 5 embodiment does not degrade under rapidly fading signal conditions.

Referring now to FIG. 6, a third embodiment of the demodulator of this invention is shown. The composite waveform consisting of carrier, subcarrier, and baseband signal, enters through antenna 10 and is amplified in RF amplifier 12. Two mixers 216 and 218 are connected to the output of RF amplifier 12, as in the previously described embodiment (FIG. 5). The output of mixer 218 consists of the subcarrier and baseband signal. The output of mixer 216 is the quadrature component of the subcarrier and baseband that is 90° out of phase with the input signal, The output of mixer circuits 216 and 218 are converted into digital form in A/D converter circuits 220 and 222. The output of A/D converter circuit 220 8 is connected to $n^{th}$ order differentiator 240. The output of A/D converter circuit 222 is connected to dividing circuit 242. The output of $n^{th}$ order differentiator 240 which is the derivative of the input signal, is also connected to the input of dividing circuit 242. Dividing circuit 242 divides the output of differentiator circuit 240 by the output of converter circuit 222 providing at its output the result of the division. The output of dividing circuit 242 is connected to the input of root circuit 286. The output of root circuit 286 is the desired root of the input signal which is an estimate of the baseband signal in digital form. The degree of the root to be taken by root circuit 286 is the same degree of the root to be taken by root as the order of the derivative taken by differentiator 240. If a first order derivative is obtained by differentiator 240, then root circuit 286 is not needed and the output of dividing circuit 242 becomes $\hat{\omega}$. If, however, a second order derivative is taken by differentiator 240, then root circuit 286 must take the square root of the input signal to provide $\hat{\omega}$.

The output conditions of the circuit of FIG. 6 in terms of the input conditions can be described by the following formula:

$$\hat{\omega}=\pm\left[\frac{\overset{(n)}{x(t)}}{y(t)}\right]^{1/n}=\pm\left[\frac{\overset{(n)}{y(t)}}{x(t)}\right]^{1/n}, \; n=1, 3, 5, \ldots \qquad (10)$$

$x(t)$ and $y(t)$ are the quadrature components, $x^{(n)}(t)$ and $y^{(n)}(y)$ are the $n^{th}$ time derivatives, and $\omega$ = frequency estimate.

Consider the input signal to be $s(t)=A\cos\{(\omega_c+\omega_0)t+\theta\}+N(t)$ (11)

where $A$ = amplitude of the signal $\theta$ = phase of the signal $N(t)$ = additive noise $\omega_0$ = the parameter to be estimated $\omega_c$ = carrier frequency The quadrature components are $x(t)=A\cos(\omega_0 t+\theta)+N_c(t)$ $y(t)=A\sin(\omega_0 t+\theta)+N+s(t)$ (12)

Assuming that $A$, $\theta$, and $\omega_0$ are constant over the measurement interval, the output of the $n^{th}$ order derivative of the in phase quadrature component is, $x^{(n)}=\pm(\omega_0)^n A\sin(\omega_0 t+\theta)+N_{c\ c}{}^{(n)}(t), n=1, 3, 5, \ldots$ (13) The frequency estimate is the obtained by dividing the quadrature signal into the $n^{th}$ derivative followed by an $n^{th}$ root operation. The result is $$\hat{\omega}=\left[\frac{\pm(\omega_0)^n A\sin(\omega_0 t+\theta)+\overset{(n)}{N_c}(t)}{A\sin(\omega_0 t+\theta)+N_s(t)}\right]^{1/n}$$

$$n=1, 3, 4, \ldots \qquad (14)$$

For the noise-free case, one can see from Equation (14) that $\omega_0=\hat{\omega}$. If noise is present, this equality does not hold.

Referring now to FIG. 7, another embodiment of the demodulator of this invention is shown. The composite waveform consisting of carrier, subcarrier and baseband signal, enters through antenna 10 and is amplified in RF amplifier 12. Two mixers 312 and 318 are connected to the output of RF amplifier 12, as in the just described embodiment (FIG. 6). The output of mixer 318 consists of the subcarrier and baseband signal. The output of mixer 316 is the quadrature component of the subcarrier and baseband that is 90° out of phase with the input signal. The output of mixer circuits 316 and 318 are converted into digital form in A/D converter circuits 320 and 322. The output of each of circuits 320 and 322 is utilized as the input to differentiator circuits 340 and 342 respectively. The operation of the differentiator circuits 340 and 342 is the same as that described in the previous embodiment, namely to obtain a desired order derivative of the input signal. The output of A/D converter is also applied to the input of squaring circuit 374. The output of A/D converter circuit 322 is applied to squaring circuit 376. The structure and operation of the squaring circuits in FIG. 7 is the same as that of the multiplying circuit in FIG. 5. Two inputs have been shown to each of the squaring circuits 370, 372, 374, and 376 because the operation performed is a multiplication of the input by itself. The output of differentiator 340 is applied to the input of squaring circuit 370 which provides the square of the input at its output. Similarly, the output of differentiator 342 is connected to the input of squaring circuit 372 which also provides the square of the input signal at its output. The output of squaring circuit 370 and 372 is added in summing circuit 380. Squaring circuits 374 and 376 also provide the square of their respective input signals at their outputs, these outputs being added in summing circuit 382. The structure and operation of summing circuits 380 and 382 is the same as that of summing circuit 180 described in the course of the description of the FIG. 5 embodiment. The output of summing circuit 380 is divided by the output of summing circuit 382 in dividing circuit 384. Dividing circuit 384 has a structure and operation as the dividing circuits previously referred to in this specification. The output of dividing circuit 384 is $\hat{\omega}$.

The output conditions of the circuit of FIG. 7 in terms of the input conditions can be described by the following formula:

$$\hat{\omega}=\left[\frac{\left(\overset{(n)}{x}\right)^2+\left(\overset{(n)}{y}\right)^2}{x^2+y^2}\right]^{1/n}, n=1,2,3,4, \ldots \qquad (15)$$

$x(t)$ and $y(t)$ are the quadrature components, $x^{(n)}$ and $y^{(n)}$ are the $n^{th}$ order time derivatives, and $\omega$ = frequency estimate Consider the input signal to be:

$s(t)=A\cos[_c+\omega_0)t+\theta]+N(t)$ (16)

where $A$ = amplitude of the signal $\theta$ = phase of the signal $N(t)$ = additive noise $\omega_0$ = the parameter to be estimated $\omega_c$ = carrier frequency The quadrature components are $x(t)=A\cos(\omega_0 t+\theta)+N\,c(t)$ $y(t)=A\sin(\omega_0+\theta)+N_s(t)$ (17)

Assuming $\theta$and $\omega_0$ are constant over the measurement interval, the output of the $n^{th}$ order differentiator with input $x(t)$ is $$\overset{(n)}{x}=\begin{cases}\pm\omega_o)^n A\cos(\omega_o t+\Theta)+\overset{(n)}{N_c} & n=2,4,6\ \ldots\\ \pm(\omega_o)^n A\sin(\omega_o t+\Theta)+\overset{(n)}{N_s} & n=1,3,5\ \ldots\end{cases} \qquad (18)$$

A similar Equation holds for $y^{(n)}$. As shown in FIG. 7, once the quadrature components are obtained, they are each fed into an $n^{th}$ order differentiator. The output of these differentiators are squared and the sum is formed. This quantity is divided by the sum of the squares of the quadrature components to complete the process.

In conclusion, an FM receiver has been disclosed for performing demodulation of an input signal entirely by digital means. This is achieved by first converting the input signal into digital form in an analog to digital converter. The series of digital numbers at the output of the analog to digital converter is analyzed by a digital demodulator to provide the baseband information in digital form.

While the invention has been particularly shown and described with reference to preferred embodiments thereof, it will be understood by those skilled in the art that various changes in form and details may be made therein without departing from the spirit and scope of the invention.

What is claimed is:

1. An apparatus for demodulating a frequency-modulated analog input signal, said signal including a subcarrier that is frequency modulated by an analog baseband signal, comprising:

a converter for sampling said analog input signal at a known rate, said converter providing one digital number at its output for each sample, said digital number representing the analog amplitude of the input signal at the sample time;

and digital-demodulating means responsive to the digital numbers for demodulating the analog baseband information from the subcarrier to provide a digital output representative of the baseband modulation frequency.

2. An apparatus as in claim 1 wherein the digital-demodulating means comprises:

a differentiating circuit responsive to the digital numbers for providing a digital derivative of the digital numbers;

a dividing circuit responsive to the digital numbers and to the digital derivative of the digital numbers for dividing the digital derivative of the digital numbers by the digital numbers;

and a root circuit responsive to the output of the dividing circuit for providing a digital root of the output of the dividing circuit, the degree of said root being equal to the order of the derivative provided by the differentiating circuit, whereby the output of the root circuit is the baseband information in digital form.

3. An apparatus for demodulating a frequency modulated analog signal comprising:

a source of frequency-modulated analog signals, said signals having a subcarrier wave modulated by analog baseband information;

converter means for obtaining digital numbers representative of the analog amplitude of the frequency-modulated signal;

an demodulating means for receiving the digital numbers and for demodulating the analog baseband information from the subcarrier to provide an output which is a digital representation of the baseband modulation frequency.

4. An apparatus for demodulating a frequency modulated analog signal comprising:

means for receiving an analog signal, said signal comprising a carrier wave modulated by a subcarrier wave, the subcarrier wave being frequency-modulated by analog baseband information;

mixer means, responsive to the analog signal, for demodulating the modulated subcarrier wave from the carrier wave;

converter means responsive to the output of said mixer means for providing digital numbers representative of the amplitude of the modulated subcarrier wave;

and demodulating means for receiving the digital numbers and for demodulating the analog baseband information from the subcarrier wave to provide a digital output representative of the baseband modulation frequency.

5. An apparatus for demodulating a frequency modulated analog input signal, said signal including a subcarrier that is frequently modulated by an analog baseband signal, comprising:

a converter for sampling said analog input signal at a known rate, said converter providing one digital number at its output for each sample, said digital number representating the analog amplitude of the input signal at the sample time;

a differential circuit responsive to the digital numbers for providing a digital derivative of the digital numbers;

a dividing circuit responsive to the digital numbers and to the digital derivative of the digital numbers for dividing the digital derivative of the digital numbers by the digital numbers, and;

a root circuit responsive to the output of the dividing circuit for providing a digital root of the output of the dividing circuit, the degree of said root being equal to the order of the derivative provided by the differentiating circuit, whereby the output of the root circuit is the baseband information in digital form.

UNITED STATES PATENT OFFICE

CERTIFICATE OF CORRECTION

Patent No. 3,609,555 Dated September 28, 1971

Inventor(s) Richard Van Blerkom, et al.

It is certified that error appears in the above-identified patent and that said Letters Patent are hereby corrected as shown below:

Column 4, line 38, "$\omega$" should be -- $\hat{\omega}$ --.

Column 4, Formula 4, "$x^{(n)} = \pm(\omega_o{}^{(n)} A \cos(\omega_o t+\theta)+N_c{}^n(t)$, should be -- $\overset{(n)}{X} = \pm (\omega_o)^n A \cos(\omega_o t + \theta) + \overset{(n)}{N}_c(t)$, --.

Column 6, Formula 8, "$x(t)=A \cos(\omega_o t+\theta)+Nc(t)$ should be -- $x(t) = A \cos(\omega_o t + \theta) + N_c(t)$ --.

Column 6, Formula 8, "$v(t)=A \sin(\omega_o t+\theta)+N_s(t)$ should be -- $y(t) = A \sin(\omega_o t + \theta) + N_s(t)$ --.

Column 7, line 2, "$x^{(n)}(t)$ and $y^{(n)}(y)$ are the $n^{th}$ time derivatives, and $\omega$ = frequency estimate. should be -- $\overset{(n)}{x}(t)$ and $\overset{(n)}{y}(y)$ are the $n^{th}$ time derivatives, and $\hat{\omega}$ = frequency estimate --.

Column 7, line 17, after "$x^{(n)} = \pm(\omega_o t+\theta) + N_c$" please omit --$_c(n)$--

Column 8, line 2, after "s(t) = A cos [" please insert --(--.

Column 8, line 13, after "$\pm$" please insert --(--.

Signed and sealed this 1st day of August 1972.

(SEAL)
Attest:

EDWARD M.FLETCHER,JR.
Attesting Officer

ROBERT GOTTSCHALK
Commissioner of Patents